United States Patent Office 3,429,852
Patented Feb. 25, 1969

3,429,852
ETHYLENICALLY UNSATURATED DERIVATIVES OF BENZOPHENONE AND CROSSLINKABLE POLYMERS THEREOF
Martin Skoultchi, Somerset, N.J., assignor to National Starch and Chemical Corporation, New York, N.Y., a corporation of Delaware
No Drawing. Filed Mar. 30, 1967, Ser. No. 626,945
U.S. Cl. 260—47                                                  12 Claims
Int. Cl. C08f 15/18, 37/06

ABSTRACT OF THE DISCLOSURE

Ethylenically unsaturated derivatives of substituted benzophenones which are prepared by means of a method involving reacting the substituted benzophenone with an ethylenically unsaturated reagent such as glycidyl acrylate and glycidyl methacrylate. The resulting monomers may, thereafter, be homo- or copolymerized with a wide variety of conventional ethylenically unsaturated, i.e. vinyl, monomers. As a result of the presence of such benzophenone monomers, the resulting copolymers are sensitive to external stimuli such as ultra-violet light and visible light and will readily crosslink upon exposure to such stimuli.

BACKGROUND OF THE INVENTION

Polymers containing vinyl monomers are ideally suited for a great variety of uses primarily because of their outstanding physical properties and their ready adaptability to economical modes of manufacture. Despite these generally excellent properties, certain disadvantages are inherent in their use such, for example, as their susceptibility to solvent action, lack of resistance to grease and oil, low zero strength temperature, excessive flexibility and poor dimensional stability.

Various crosslinkable techniques have been resorted to in an attempt to overcome the aforementioned difficulties by transforming these polymers from their conventional linear, two dimensional form into a crosslinked, three dimensional network. Such techniques have included chemical reaction with peroxides, treatment with ultra-violet light, similar ultra-violet light exposure where photosensitizers had first been blended with the polymers, and bombardment with electrons. These methods have not, however, proved to be completely effective or practical inasmuch as they sometimes necessitate the use of harsh reaction conditions, and often result in the degradation of the polymer as evidenced by oxidation and cleavage of the polymer chain as well as by its instability to heat. Where extraneous photosensitizers were of necessity blended with the polymers, problems of compatibility, uniform dispersion, volatility, toxicity, exudation and migration of the additive have been encountered thereby often resulting in premature and non-uniform crosslinking.

SUMMARY OF THE INVENTION

It is, thus, the object of this invention to provide a novel class of ethylenically unsaturated derivatives of substituted benzophenone, said derivatives being capable of undergoing vinyl type polymerization reactions either alone or in the presence of other vinyl type monomers. A further object of this invention is to provide polymeric compositions containing the latter ethylenically unsaturated derivatives of substituted benzophenone, the presence of such derivatives in said polymeric compositions rendering them sensitive to ultra-violet and visible light and thus capable of crosslinking upon exposure to the latter light sources. Various other objects and advantages of this invention will become apparent to the practitioner from a reading of the following description.

The novel monomeric compositions of this invention are the ethylenically unsaturated derivatives of substituted benzophenone corresponding to the formulae:

(1) 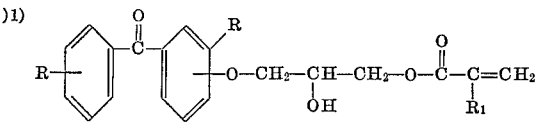

and (2) 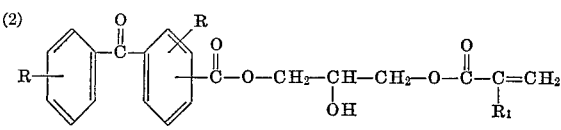

wherein R is a radical selection from the group consisting of the hydrogen and lower alkyl radical and $R_1$ is a radical selected from the group consisting of the hydrogen and methyl radicals.

As representative of the above described substituted benzophenone derivatives of this invention, one may list the following compounds all of which may be characterized as either ethers or esters of substituted benzophenone:

(2-hydroxy-3-methacryloxy)propyl ortho-benzoyl-
  benzoate;
(2-hydroxy-3-acryloxy)propyl ortho-benzoylbenzoate;
(2-hydroxy-3-methacryloxy)propyl para-benzoylbenzoate;
(2-hydroxy-3-acryloxy)propyl para-benzoylbenzoate;
(2-hydroxy-3-methacryloxy)propoxy ortho-benzoyl-
  benzene;
(2-hydroxy-3-acryloxy)propoxy ortho-benzoylbenzene;
(2-hydroxy-3-methacryloxy)propoxy para-benzoyl-
  benzene;
(2-hydroxy-3-acryloxy)propoxy para-benzoylbenzene;
(2-hydroxy-3-methacryloxy)propyl ortho-(o'-methyl-
  benzoyl)benzoate;
(2-hydroxy-3-acryloxy)propyl ortho-(o'-methylbenzoyl)
  benzoate;
(2-hydroxy-3-methacryloxy)propyl ortho-(m'-methyl-
  benzoyl)benzoate;
(2-hydroxy-3-acryloxy)propyl ortho-(m'-methylbenzoyl)
  benzoate;
(2-hydroxy-3-methacryloxy)propyl ortho-(p'-methyl-
  benzoyl)benzoate;
(2-hydroxy-3-acryloxy)propyl ortho-(p'-methylbenzoyl)
  benzoate;
(2-hydroxy-3-methacryloxy)propoxy para-(o'-methyl-
  benzoyl)benzene;
(2-hydroxy-3-acryloxy)propoxy para-(o'-methylbenzoyl)
  benzene;
(2-hydroxy-3-methacryloxy)propoxy para-(m'-methyl-
  benzoyl)benzene;
(2-hydroxy-3-acryloxy)propoxy para-(m'-methylbenzoyl)
  benzene;
(2-hydroxy-3-methacryloxy)propoxy para-(p'-methyl-
  benzoyl)benzene;
(2-hydroxy-3-acryloxy)propoxy para-(p'-methylbenzoyl)
  benzene;
(2-hydroxy-3-methacryloxy)propyl ortho-benzoyl-para-
  methylbenzoate;
(2-hydroxy-3-acryloxy)propyl ortho-benzoyl-para-
  methylbenzoate;
(2-hydroxy-3-methacryloxy)propoxy ortho-methyl-para-
  benzoylbenzene; and
(2 - hydroxy - 3 - acryloxy)propoxy ortho - methyl-para-
  benzoylbenzene.

All of the above listed compounds, as well as any others, which may correspond to the above definition, are materials which are capable of readily undergoing vinyl type polymerization reactions with a wide variety of other vinyl type monomers, the resulting copolymers exhibiting sensitivity to ultra-violet and visible light and thus readily crosslinking upon exposure to such stimuli. This beneficial property is exhibited by these copolymers as a result of the presence therein of the substituted benzophenone moiety which is permanently bound into and inherently part of the resulting copolymer molecule. In addition to obviating the difficulties inherent in the use of extraneous additives, such as migration and non-uniformity, the permanent bonding of the benzophenone group in the polymeric back-bone increases the crosslinking efficiency of such copolymers to a degree which was not previously attainable by the use of post-added photosensitizers. Such permanent bonding also provides a crosslinking potential for copolymers wherein such crosslinking was not previously possible.

DETAILED DESCRIPTION OF THE INVENTION

In brief, the synthesis of my novel derivatives is accomplished by the catalyzed reaction of a selected substituted benzophenone intermediate, as hereinafter defined, with an ethylenically unsaturated reagent selected from the group consisting of glycidyl acrylate and glycidyl methacrylate.

The substituted benzophenone compounds which are applicable for use as intermediates in preparing the novel ethylenically unsaturated benzophenone derivatives of this invention correspond to the formulae:

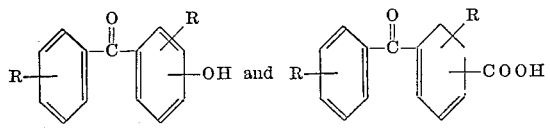

wherein R is as defined hereinabove.

As representative of the above described substituted benzophenone intermediates, one may list the following compounds:

Ortho-benzoylbenzoic acid, i.e.

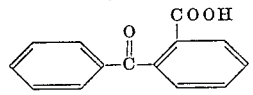

Meta-benzoylbenzoic acid, i.e.

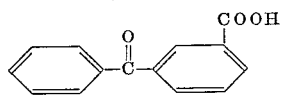

Para-benzoylbenzoic acid, i.e.

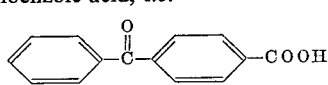

Ortho-hydroxybenzophenone, i.e.

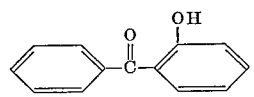

Meta-hydroxybenzophenone, i.e.

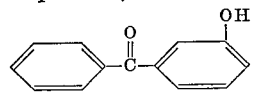

Para-hydroxybenzophenone, i.e.

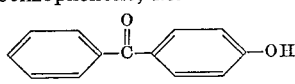

Ortho-(p'-methylbenzoyl) benzoic acid, i.e.

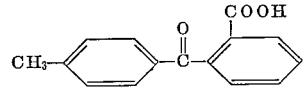

p'-Methyl-para-hydroxybenzophenone, i.e.

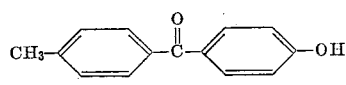

Ortho-benzoyl-para-methyl benzoic acid, i.e.

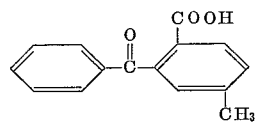

and

Ortho-methyl-para-hydroxybenzophenone, i.e.

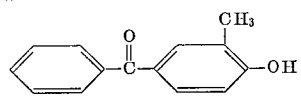

In conducting the reaction which leads to the synthesis of my novel derivatives, the selected ethylenically unsaturated reagent, i.e. either glycidyl acrylate or glycidyl methacrylate, in an equimolar concentration or a concentration amounting to a slight stoichiometric excess in the order of about 10 to 20% over the subsequently added benzophenone intermediate, is first ordinarily admixed with the selected catalyst. The latter may be chosen from among any member of the group consisting of alkali metal hydroxides, such as sodium hydroxide or potassium hydroxide; the salts of alkali metals, such as sodium bicarbonate or sodium chloride; the alkali metal acetates, such as sodium acetate or lithium acetate; and, the quaternary ammonium halides, such as tetramethylammonium chloride or tetrabutylammonium iodide. These catalysts should be present in concentrations of about 0.1 to 10.0%, as based on the weight of the ethylenically unsaturated reagent.

Following the initial preparation of the mixture comprising the catalyst and the ethylenically unsaturated reagent, the benzophenone intermediate is thereupon added with constant agitation. However, it should be emphasized that the use of this particular sequence is not critical to the process of this invention and may be altered by the practitioner to suit his particular needs. It is, in fact, possible to admix the reactants and the catalyst in any desired sequence. In any event, following the complete admixture of the benzophenone intermediate with the catalyst and the ethylenically unsaturated reagent, agitation is continued while the resulting reaction mixture is maintained at a temperature in the range of about 50 to 100° C., and preferably at about 70 to 90° C., for a period of about 2 to 14 hours. Under these conditions, the reaction between the benzophenone intermediate and the ethylenically unsaturated reagent will ordinarily proceed at a conversion in the range of about 80 to 95%.

In general, the preparation of the derivatives of this invention may be conducted at any temperature which will be high enough so as to result in an adequate reaction rate. In addition, the length of the reaction period will depend, for the most part, upon the specific ethylenically unsaturated reagent which is being utilized. Thus, it is a matter of ordinary preparative experience on the part of the practitioner to determine the precise combination of time and temperature which will be best suited for his synthesis of any of the novel benzophenone derivatives coming within the scope of this invention, since the examples herein are merely illustrative.

Upon the completion of the reaction and with subsequent cooling of the reaction vessel to room temperature, the resulting products will ordinarily be in the form of viscous oils. For most purposes, including any subsequent polymerization reaction, this crude ethylenically unsaturated benzophenone derivative can then be used without any further purification being necessary. However, where desired, the relatively small amount of unreacted benzophenone intermediate may be removed. Thus, such means as chromatographic separation techniques, as for example with the use of a silica gel column, have been found to yield a product which, by means of saponification equivalent analysis, will indicate a purity of almost 100%, by weight. Other separation techniques, such as aqueous alkali or organic solvent extraction procedures, may also be used where so desired by the practitioner.

It is also possible to prepare the novel derivatives of this invention by reaction in an organic solvent medium. Under these conditions, the benzophenone intermediate, the catalyst and the ethylenically unsaturated reagent may all be dissolved in a non-reactive polar solvent such as acetone, methyl ethyl ketone, tetrahydrofuran, dimethyformamide or dimethylsulfoxide. The resulting derivative would then be recovered by distilling off the solvent whereupon the crude product could, again, be purified by means of the above noted techniques.

In utilizing my ethylenically unsaturated benzophenone derivatives in the preparation of homo- and copolymers, there may be employed any of the usual vinyl polymerization methods which are well known to those skilled in the art and which is particularly suited for the homo- and copolymer whose preparation is desired. Thus, such polymers may be prepared by means of free radical initiated processes utilizing bulk, suspension, solution, or emulsion polymerization techniques; or, they may be prepared by ionic catalysis or by means of stereospecific catalysts such as those of the type developed by Ziegler.

The comonomers which may be utilized together with the above described ethylenically unsaturated benzophenone derivatives for the preparation of the crosslinkable copolymers of this invention can be any ethylenically unsaturated monomer such, for example, as styrene; alphamethyl styrene; the acrylic and methacrylic acid esters of aliphatic alcohols such as methyl, ethyl, propyl, butyl, isobutyl, amyl, hexyl, 2-ethyl hexyl, octyl, lauryl and stearyl alcohols; acrylic acid, methacrylic acid; isoprene; acrylamide; methacrylamide, acrylonitrile; methacrylonitrile, butadiene; vinyl propionate; dibutyl fumarate; dibutyl maleate; diallyl phthalate; vinylidene chloride; vinyl chloride; vinyl fluoride; vinyl acetate; ethylene; and, propylene, etc. Any of these monomers may be used either alone or in combination with one another together with one or more of the benzophenone containing monomers.

In order to effectively crosslink upon exposure to ultraviolet and visible light, the copolymers of this invention should contain from about 0.1 to 50%, by weight, of at least one of these ethylenically unsaturated benzophenone derivatives. When the concentration of ethylenically unsaturated benzophenone derivative substantially exceeds about 50%, by weight, the crosslinking efficiency of the copolymer is markedly reduced because of the reduced concentration, in the copolymer, of the moieties derived from the conventional monomers.

The copolymers of this invention, whether prepared by means of bulk, suspension, solution, or emulsion polymerization techniques or by other means, are all characterized by their sensitivity to ultra-violet and visible light and thus are readily crosslinked by exposure thereto. This improved crosslinking ability is at least fully equivalent, and in most cases superior, to the results obtained when extraneous photosensitizers are added to the comparable polymers which do not contain these benzophenone derivatives. Moreover, all of the deficiencies which are inherent in the use of these extraneous photosensitizers are completely avoided with the products of this invention. Thus, these novel polymeric compositions exhibit excellent crosslinking ability without the difficulties posed by such problems as volatility, toxicity, migration and premature crosslinking.

In addition to the preparation of conventional copolymers which are prepared by the polymerization of one or more of the novel benzophenone derivatives of this invention together with one or more vinyl comonomers, it is also possible to prepare graft copolymers wherein the benzophenone derivatives of this invention are polymerized in the presence of previously prepared vinyl polymers such as polyolefins, polyvinyl halides and polyvinyl esters. The resulting graft copolymers also exhibit excellent crosslinking ability upon being exposed to ultra-violet and visible light.

In order to crosslink the novel copolymers of this invention, it is merely necessary to expose them to ultraviolet or visible light, i.e. to radiation having a wavelength of 200 to 7,000 A., for a period of time which is sufficient to accomplish the desired amount of crosslinking and yet which will not result in any undesirable degradation of the copolymer, said degradation being in the form of oxidation and chain cleavage of the copolymer and being manifested by discoloration and a marked deterioration in the phsyical properties of the coploymer composition. The length of exposure will also be dependent on the source of radiation as well as on the distance between the source and the copolymer sample.

The crosslinking procedure may be conducted while the copolymer is still in the initial physical form resulting from the polymerization procedure. However, it is preferred and more convenient to effect the crosslinking reaction after the polymer has been formed into a shaped article, e.g. a film, coating, or molded article. In either instance, the degree of crosslinking will be determined by the extent to which the copolymer has been insolubilized. Thus, for example, if the copolymer is still in solution, crosslinking will be evidenced by the progressive precipitation or gellation of the dissolved copolymer. On the other hand, if the copolymer has been formed into a shaped article, crosslinking will be noted by the resistance exhibited by the shaped article to solvents in which it would ordinarily dissolve or soften.

The resulting crosslinked compositions can now be used for a wide variety of applications. Thus, they may be used in applications wherein high oil, grease and solvent resistance as well as increased stiffness are required. Specifically, they may be used in photo-reproduction processes, in processes wherein it is desirable to engrave or carve intricate shapes and/or designs without the use of cutting tools, and in industrial construction, etc.

Although glycidyl acrylate and glycidyl methacrylate are the preferred ethylenically unsaturated reagents with regard to the process of this invention, other ethylenically unsaturated reagents may also be effectively utilized therein. Thus, for example, the benzophenone intermediates may be reacted either with allyl glycidyl ether or butadiene monoxide, thereby preparing ethylenically unsaturated derivatives of benzophenone corresponding to the following formulae:

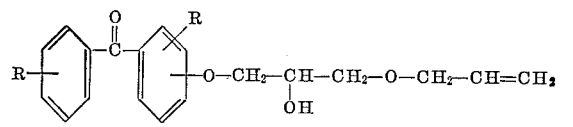

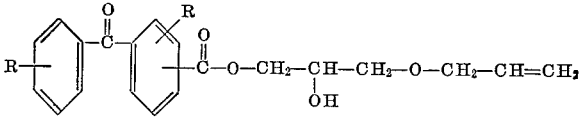

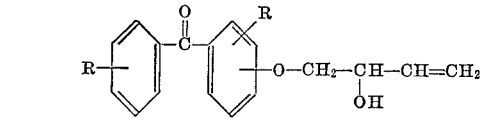

and

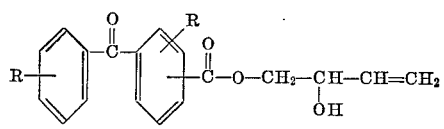

wherein R is as previously designated. Copolymeric compositions containing the latter benzophenone derivatives also exhibit excellent crosslinking ability upon being exposed to ultra-violet and visible light.

The following examples will more clearly illustrate the

Example I

This example illustrates the preparation of (2-hydroxy-3-methacryloxy) propyl ortho-benzoylbenzoate, i.e.

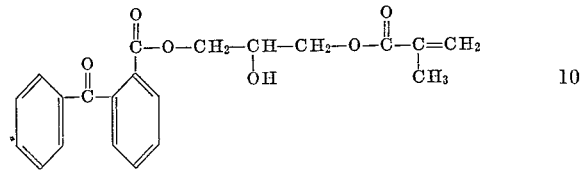

by means of the process of this invention.

A mixture of 113 parts of ortho-benzoylbenzoic acid, 78 parts of glycidyl methacrylate, 2.5 parts of tetramethylammonium chloride and 0.2 part of p-methoxyphenol was heated, while under agitation, to a temperature in the range of 70° C. and maintained at that temperature for a period of 2½ hours. Upon being cooled to room temperature, the resulting reaction product, which was in the form of a viscous oil, was removed and subjected to a base titration. The latter analysis revealed that there was about 2.2% of unreacted ortho-benzoylbenzoic acid present within this reaction product which thereby indicated a conversion of about 96% to (2-hydroxy-3-methacryloxy)propyl ortho-benzoylbenzoate.

Example II

This example illustrates the preparation of (2-hydroxy-3-acryloxy)propyl para-benzoylbenzoate, i.e.

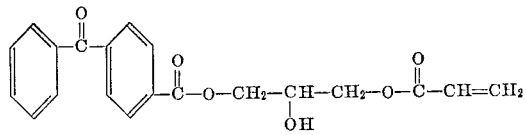

by means of the process of this invention.

A mixture of 113 parts of para-benzoylbenzoic acid, 75.5 parts of glycidyl acrylate, 4.0 parts of lithium acetate and 0.2 part of p-methoxyphenol was heated, while under agitation, to a temperature in the range of 70° C. and maintained at that temperature for a period of 2½ hours. Upon being cooled to room temperature, the resulting reaction product, which was in the form of a viscous oil, was removed and subjected to a base titration. The latter analysis revealed that there was about 1% of unreacted para-benzoylbenzoic acid present within this reaction product which thereby indicated a conversion of about 98% to (2-hydroxy-3-acryloxy)propyl para-benzoylbenzoate.

Example III

This example illustrates the preparation of (2-hydroxy-3-methacryloxy)propoxy para-benzoylbenzene, i.e.

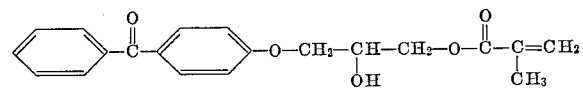

by means of the process of this invention.

A mixture of 99 parts of para-hydroxybenzophenone, 78 parts of glycidyl methacrylate, 2.5 parts of tetramethylammonium chloride and 0.2 part of p-methoxyphenol was heated, while under agitation, to a temperature in the range of 80° C. and maintained at that temperature for a period of 4 hours. Upon being cooled to room temperature, the resulting reaction product, which was in the form of a viscous oil, was removed and subjected to a base titration. The latter analysis revealed that there was about 1.4% of unreacted para-hydroxybenzophenone present within this reaction product which thereby indicated a conversion of about 97% to (2-hydroxy-3-methacryloxy)propoxy para-benzoylbenzene.

Example IV

This example illustrates the preparation of (2-hydroxy-3-methacryloxy)propyl ortho - (p'-methylbenzoyl)benzoate, i.e.

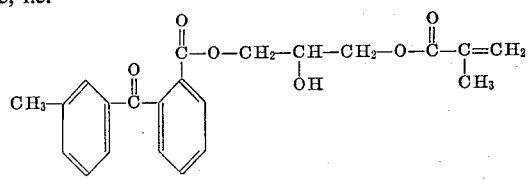

by means of the process of this invention.

A mixture of 127 parts of ortho-(p'-methylbenzoyl) benzoic acid, 78 parts of glycidyl methacrylate, 2.5 parts of tetramethylammonium chloride and 0.2 part of p-methoxyphenol was heated, while under agitation, to a temperature in the range of 70° C. and maintained at that temperature for a period of 2½ hours. Upon being cooled to room temperature, the resulting reaction product, which was in the form of a viscous oil, was removed and subjected to a base titration. The latter analysis revealed that there was about 2.2% of unreacted ortho-(p'-methylbenzoyl) benzoic acid present within this reaction product which thereby indicated a conversion of about 96% to (2 - hydroxy - 3 - methacryloxy)propyl ortho-(p'-methylbenzoyl) benzoate.

Example V

This example illustrates the preparation of (2-hydroxy-3-methacrylate)propoxy ortho - methyl - para-benzoylbenzene, i.e.

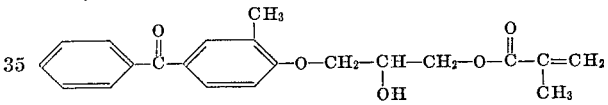

by means of the process of this invention.

A mixture of 113 parts of ortho-methyl-para-hydroxybenzophenone, 78 parts of glycidyl methacrylate, 2.5 parts of tetramethylammonium chloride and 0.2 part of p-methoxyphenol was heated, while under agitation, to a temperature in the range of 80° C. and maintained at that temperature for a period of 4 hours. Upon being cooled to room temperature, the resulting reaction product, which was in the form of a viscous oil, was removed and subjected to a base titration. The latter analysis revealed that there was about 1.4% of unreacted ortho-methyl-para-hydroxybenzophenone present within this reaction product which thereby indicated a conversion of about 97% to (2 - hydroxy - 3 - methacryloxy)propoxy ortho - methyl-para-benzoylbenzene.

Example VI

This example illustrates the preparation of the novel copolymers of this invention by means of a solution polymerization technique and also demonstrates the ability of the resulting copolymers to crosslink upon being exposed to a light source.

The ingredients listed in the following table were utilized to prepare the copolymers described in this example.

|  | Parts | | | | | |
| --- | --- | --- | --- | --- | --- | --- |
| Copolymer No. | 1 | 2 | 3 | 4 | 5 | 6 |
| (2-hydroxy-3-methacryloxy) propyl ortho-benzoylbenzoate | 30 | 15 | 9 | 1 | | |
| (2-hydroxy-3-methacryloxy) propoxy para-benzoylbenzene | | | | | 30 | |
| (2-hydroxy-3-methacryloxy) propyl ortho-(p'-methylbenzoyl)benzoate | | | | | | 10 |
| Ethyl acrylate | 30 | 45 | 51 | 59 | | 50 |
| Methyl acrylate | | | | | 30 | |
| Ethyl acetate | 60 | 120 | 120 | 120 | 60 | 120 |
| Isopropanol | 60 | | | | 60 | |
| Benzoyl peroxide | 0.6 | 0.6 | 0.6 | 0.6 | 0.6 | 0.6 |

In each instance, the copolymer was prepared by charging the above identified ingredients into a reactor equipped with a reflux condenser as well as with means for mechanical agitation, the latter reactor being completely shielded so as to exclude all light from the reaction mixture. The resulting mixture was then refluxed, while under agitation, for a period of 6 hours whereupon it was allowed to cool and discharged from the reactor.

In order to ascertain the crosslinking ability of the resulting copolymeric compositions, films having 3.0 mil wet thicknesses were cast from the various lacquers onto glass plates and then air-dried in total darkness. A portion of each of the films was then masked off and the entire film thereupon exposed, for a period of 15 minutes, to a fluorescent black-light source which was positioned at a distance of 8″ from the film samples.

Thereafter, the masking was removed and the entire film surface washed with acetone. In each instance, the unexposed portion of the film was readily soluble in the acetone whereas the exposed portion exhibited a substantially reduced solubility, with the films derived from copolymers #2 and #3 exhibiting almost complete insolubility. This reduction in solubility is thus clearly indicative of the ability of films prepared from copolymers containing the novel benzophenone derivatives of this invention to crosslink upon being exposed to a suitable light source.

Example VII

This example further illustrates the ability of the copolymers of this invention to crosslink upon exposure to a suitable light source. In addition, it illustrates the lack of crosslinking potential on the part of comparable polymers which do not, however, contain the novel benzophenone derivatives of this invention. It also provides a comparison of my novel copolymers with copolymers wherein photosensitizers are physically added at the conclusion of the polymerization reaction.

The following homo- and copolymers were prepared according to the procedure set forth in Example VI, hereinabove.

|  | Parts | | | | | | | |
| --- | --- | --- | --- | --- | --- | --- | --- | --- |
| Polymer No. | 1 | 2 | 3 | 4 | 5 | 6 | 7 | 8 |
| (2-hydroxy-3-acryloxy) propyl para-benzoyl benzoate |  | 5 |  | 5 |  | 5 |  | 5 |
| Methyl acrylate | 50 | 45 |  |  |  |  |  |  |
| Ethyl acrylate |  |  | 100 | 95 |  |  |  |  |
| Butyl acrylate |  |  |  |  | 100 | 95 |  |  |
| Butyl methacrylate |  |  |  |  |  |  | 100 | 95 |
| Ethyl acetate | 100 | 100 | 150 | 150 | 150 | 150 | 150 | 150 |
| Benzoyl peroxide | 0.4 | 0.4 | 0.75 | 0.75 | 0.65 | 0.65 | 0.75 | 0.75 |

The resulting lacquers were then cast onto glass plates in films having 3.0 mil wet thicknesses, air-dried in total darkness and exposed, for a period of 20 minutes, to either a black-light fluorescent lamp or to a General Electric R–S Sunlamp, the light source being positioned at a distance of 12 inches from the film.

In order to illustrate the resultant crosslinking, one gram samples of each of the films were placed in 100 cubic centimeters of acetone and retained therein, with occasional agitation, for a period of 16 hours. The degree of solubility was then determined either by filtering, drying and weighing the residual insolubles or by analyzing aliquot samples of the acetone solvent.

Additionally, equivalent amounts of benzoin or ortho-benzoylbenzoic acid, the latter reagents being known for their photosensitizing abilities, were dissolved in several of the homopolymer lacquers after the completion of the homopolymerization reaction. Films derived from the latter lacquers were then prepared and tested according to the above described procedures.

| Polymer No. | Light Source | Initial Percent by weight of Insolubles | Percent by weight of Insolubles after Exposure |
| --- | --- | --- | --- |
| 1 | R–S Sunlamp | 0 | 0 |
| 2 | do | 2 | 31 |
| 3 | Black-light | 0 | 0 |
| 3 [1] | do | 0 | 0 |
| 4 | do | 0 | 61 |
| 5 | R–S Sunlamp | 0 | 0 |
| 5 [1] | Black-light | 0 | 4 |
| 6 | R–S Sunlamp | 0 | 85 |
| 6 | Black-light | 0 | 59 |
| 7 | R–S Sunlamp | 0 | 1 |
| 7 [2] | do | 0 | 0 |
| 8 | do | 0 | 61 |

[1] Post-added benzoin.   [2] Post-added o-benzoylbenzoic acid.

The results summarized above thus clearly indicate the high degree of crosslinking that is obtainable with the novel copolymers of this invention as contrasted with polymers which do not contain the unique benzophenone derivatives of this invention. Additionally, the vastly increased crosslinking efficiency which was achieved further emphasizes the advantages which are derived from having the sensitizer permanently bound into the polymeric back-bone as opposed to merely physically blending such sensitizers by means of a post-polymerization addition procedure.

Summarizing, this invention is thus seen to provide a novel class of ethylenically unsaturated benzophenone derivatives which may be incorporated into a wide variety of copolymers; the resulting copolymers thereby being characterized by their ability to crosslink upon being exposed to an appropriate light source.

Variations may be made in proportions, procedures and materials without departing from the scope of this invention as defined by the following claims.

What is claimed is:

1. An ethylenically unsaturated derivative of a substituted benzophenone selected from the group consisting of:

(1)

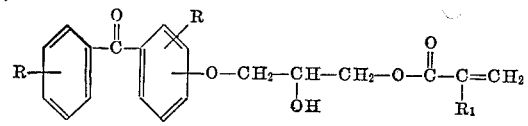

and (2)

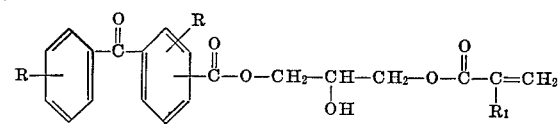

wherein R is a radical selected from the group consisting of the hydrogen and lower alkyl radicals and $R_1$ is a radical selected from the group consisting of the hydrogen and methyl radicals.

2. The ethylenically unsaturated derivative of claim 1 selected from the group consisting of:

(2-hydroxy-3-methacryloxy)propyl ortho-benzoylbenzoate;
(2-hydroxy-3-acryloxy)propyl ortho-benzoylbenzoate;
(2-hydroxy-3-methacryloxy)propyl para-benzoylbenzoate;

(2hydroxy-3-acryloxy)propyl para-benzoylbenzoate;
(2-hydroxy-3-methacryloxy)propoxy ortho-benzoylbenzene;
(2-hydroxy-3-acryloxy)propoxy ortho-benzoylbenzene;
(2-hydroxy-3-methacryloxy)propoxy para-benzoylbenzene;
(2-hydroxy-3-acryloxy)propoxy para-benzoylbenzene;
(2-hydroxy-3-methacryloxy)propyl ortho-(o'-methylbenzoyl)benzoate;
(2-hydroxy-3-acryloxy)propyl ortho-(o'-methylbenzoyl)benzoate;
(2-hydroxy-3-acryloxy)propyl ortho-(m'-methylbenzoyl)benzoate;
(2-hydroxy-3-methacryloxy)propyl ortho(m'-methylbenzoyl)benzoate;
(2-hydroxy-3-methacryloxy)propyl ortho-(p'-methylbenzoyl)benzoate;
(2-hydroxy-3-acryloxy)propyl ortho-(p'-methylbenzoyl)benzoate;
(2-hydroxy-3-methacryloxy)propoxy para(o'-methylbenzoyl)benzene;
(2-hydroxy-3-acryloxy)propoxy para-(o'-methylbenzoyl)benzene;
(2-hydroxy-3-methacryloxy)propoxy para-(m'-methylbenzoyl)benzene;
(2-hydroxy-3-acryloxy)propoxy para-(m'-methylbenzoyl)benzene;
(2-hydroxy-3-methacryloxy)propoxy para-(m'-methylbenzoyl)benzene;
(2-hydroxy-3-acryloxy)propoxy para(p'-methylbenzoyl)benzene;
(2-hydroxy-3-methacryloxy)propyl ortho-benzoyl-para-methylbenzoate;
(2-hydroxy-3-acryloxy)propyl ortho-benzoyl-para-methylbenzoate;
(2-hydroxy-3-methacryloxy)propoxy orthomethyl-para-benzoylbenzene; and,
(2-hydroxy-3-acryloxy)propoxy ortho-methyl-para-benzoylbenzene.
benzoylbenzene 3. A composition comprising a polymer of at least one ethylenically unsaturated monomer together with at least one ethylenically unsaturated derivative of a substituted benzophenone selected from the group consisting of:

(1)
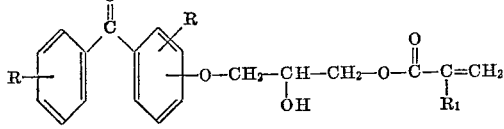

and (2)
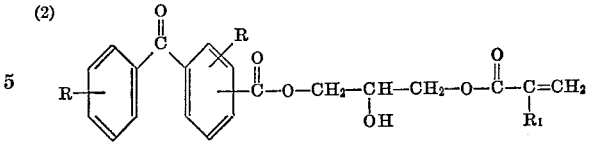

wherein R is a radical selected from the group consisting of the hydrogen and lower alkyl radicals and $R_1$ is a radical selected from the group consisting of the hydrogen and methyl radicals.

4. The composition of claim 3, wherein said unsaturated monomer is selectde from the group consisting of styrene, alpha-methyl styrene, the acrylic and methacrylic esters of aliphatic alcohols, acrylic acid, methacrylic acid, isoprene, acrylamide, methacrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

5. A copolymer of ethyl acrylate and (2-hydroxy-3-methacryloxy)propyl ortho-benzoylbenzoate.

6. A copolymer of methyl acrylate and (2-hydroxy-3-methacryloxy)propoxy para-benzoylbenzene.

7. A copolymer of ethyl acrylate and (2-hydroxy-3-methacryloxy)propyl ortho-(p'-methylbenzoyl)benzoate.

8. A copolymer of methyl acrylate and (2-hydroxy-3-acryloxy)propyl para-benzoylbenzoate.

9. A copolymer of ethyl acrylate and (2-hydroxy-3-acryloxy)propyl para-benzoylbenzoate.

10. A copolymer of butyl acrylate and (2-hydroxy-3-acryloxy)propyl para-benzoylbenzoate.

11. A copolymer of butyl methacrylate and (2-hydroxy-3-acryloxy)propyl para-benzoylbenzoate.

12. The composition of claim 3, wherein said polymer is crosslinked.

References Cited

UNITED STATES PATENTS 3,214,492  10/1965  Tocker _____ 260—878
3,341,493  9/1967  Goldberg et al. _____ 260—47

JOSEPH L. SCHOFER, Primary Examiner.

C. A. HENDERSON, JR., Assistant Examiner.

U.S. Cl. X.R.

260—486; 204—159.14; 260—875, 884